United States Patent
Der Marderosian et al.

(10) Patent No.: US 7,775,576 B2
(45) Date of Patent: Aug. 17, 2010

(54) AIR PUMP ASSEMBLY

(75) Inventors: Daniel R. Der Marderosian, Westwood, MA (US); Heinz Bauer, Baden-Baden (DE); Stephane Laurent, Strasbourg (FR); Peter Bolz, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 1818 days.

(21) Appl. No.: 10/877,357

(22) Filed: Jun. 25, 2004

(65) Prior Publication Data

US 2005/0287024 A1 Dec. 29, 2005

(51) Int. Cl.
*B60N 2/02* (2006.01)
(52) U.S. Cl. ............... 296/63; 296/65.18; 417/557
(58) Field of Classification Search ............ 296/63, 296/68.1, 65.01, 65.02, 65.08, 65.12, 65.15, 296/65.17, 65.18; 297/284.1–284.11, 180.13, 297/180.14; 417/557
See application file for complete search history.

(56) References Cited

U.S. PATENT DOCUMENTS

| | | | |
|---|---|---|---|
| 3,493,214 A | 2/1970 | Edwards et al. | |
| 3,548,280 A | 12/1970 | Cockroft | |
| 3,575,524 A | 4/1971 | Adajian | |
| 3,866,263 A | 2/1975 | Crouser et al. | |
| 4,071,789 A | 1/1978 | Ernster et al. | |
| 4,115,030 A | 9/1978 | Inagaki et al. | |
| 4,132,912 A | 1/1979 | Wright | |
| 4,150,313 A | 4/1979 | Panza | |
| 4,264,282 A | 4/1981 | Crago | |
| 4,389,160 A | 6/1983 | Onal | |
| 4,444,430 A * | 4/1984 | Yoshida et al. | 297/284.6 |
| 4,491,364 A * | 1/1985 | Hattori et al. | 297/284.6 |
| 4,592,588 A * | 6/1986 | Isono et al. | 297/284.6 |
| 4,781,545 A | 11/1988 | Yokomizo et al. | |
| 5,005,904 A * | 4/1991 | Clemens et al. | 297/284.6 |
| 5,006,740 A | 4/1991 | Palm | |
| 5,021,696 A | 6/1991 | Nelson | |
| 5,084,641 A | 1/1992 | Saima et al. | |
| 5,124,600 A | 6/1992 | Hedeen | |
| 5,182,482 A | 1/1993 | Burke | |
| 5,244,275 A | 9/1993 | Bauer et al. | |
| 5,273,358 A | 12/1993 | Byrne et al. | |
| 5,317,224 A | 5/1994 | Ragaly | |

(Continued)

FOREIGN PATENT DOCUMENTS

DE 9407301 U 7/1994

(Continued)

*Primary Examiner*—Glenn Dayoan
*Assistant Examiner*—Gregory Blankenship
(74) *Attorney, Agent, or Firm*—Michael Best & Friedrich LLP

(57) ABSTRACT

An air pump assembly includes a pump module having an outer surface and a casing at least partially surrounding the pump module. The casing has an inner surface defining a cavity sized to snugly receive the pump module such that the outer surface of the pump module is in substantial engagement with the inner surface of the casing and is substantially prevented from moving with respect to the casing when the pump module is received within the cavity. At least one airflow passageway is defined between the inner surface of the casing and the outer surface of the pump module. The airflow passageway is configured so that air flowing through the passageway changes direction at least one time to reduce the transmission of noise from the air pump assembly.

35 Claims, 7 Drawing Sheets

U.S. PATENT DOCUMENTS

| | | |
|---|---|---|
| 5,327,036 A | 7/1994 | Carey |
| 5,453,647 A | 9/1995 | Hedeen et al. |
| 5,529,377 A * | 6/1996 | Miller ...................... 297/284.6 |
| 5,558,398 A * | 9/1996 | Santos ...................... 297/284.3 |
| 5,614,774 A | 3/1997 | McCallops et al. |
| 5,650,675 A | 7/1997 | Kanaya et al. |
| 5,707,109 A * | 1/1998 | Massara et al. .......... 297/284.9 |
| 5,866,959 A | 2/1999 | Le Flem |
| 6,069,423 A | 5/2000 | Miller et al. |
| 6,129,419 A * | 10/2000 | Neale ...................... 297/284.4 |
| 6,474,954 B1 | 11/2002 | Bell et al. |
| 6,483,264 B1 | 11/2002 | Shafer et al. |
| 6,612,646 B1 * | 9/2003 | Gunther et al. .......... 297/216.1 |
| 7,216,934 B1 * | 5/2007 | Kobari ...................... 297/284.9 |
| 7,427,109 B2 * | 9/2008 | Embach et al. ......... 297/452.41 |
| 7,478,869 B2 * | 1/2009 | Lazanja et al. ......... 297/180.14 |
| 2003/0003003 A1 | 1/2003 | Leonhard |
| 2003/0160479 A1 * | 8/2003 | Minuth et al. .......... 297/180.14 |
| 2003/0202877 A1 | 10/2003 | Kamiya et al. |

FOREIGN PATENT DOCUMENTS

| | | |
|---|---|---|
| DE | 10319270 | 11/2003 |
| EP | 0595459 | 5/1994 |
| JP | 57170041 A | 10/1982 |
| JP | 59123442 A | 7/1984 |
| JP | 2179242 A | 7/1990 |
| WO | WO 0045673 | 8/2000 |

* cited by examiner

AIR PUMP ASSEMBLY

FIELD OF THE INVENTION

The invention relates to air pumps, and more specifically to air pumps used for manipulating seats in a vehicle.

BACKGROUND OF THE INVENTION

Active or dynamic passenger seat control is becoming more commonplace in the passenger car market. Features such as raising or lowering portions of the seats during vehicle maneuvering or adjusting the firmness of the seat supports are typical enhancements. It is also known to provide massage capabilities to the seats. Seats having these capabilities are sometimes referred to as drive dynamic seats.

SUMMARY OF THE INVENTION

One method for manipulating and controlling drive dynamic seats involves using compressed air. The compressed air can be supplied to one or more bolsters in a seat from a unit containing a pump/compressor, a motor, and the associated electronics. To avoid overheating, the unit can incorporate a cooling fan that provides cooling airflow. Because the unit is located in or near the passenger compartment of the vehicle, the operating noise of the unit should be minimized.

The invention provides an air pump assembly designed to minimize operating noise while maximizing cooling airflow. More specifically, the invention provides an air pump assembly including a pump module having an outer surface and a casing at least partially surrounding the pump module. The casing has an inner surface defining a cavity sized to snugly receive the pump module such that the outer surface of the pump module is in substantial engagement with the inner surface of the casing and is substantially prevented from moving with respect to the casing when the pump module is received within the cavity. At least one airflow passageway is defined between the inner surface of the casing and the outer surface of the pump module.

In one aspect of the invention, the airflow passageway is configured so that air flowing through the passageway changes direction at least one time to reduce the transmission of noise from the air pump assembly. A labyrinth-shaped passageway can be used.

In another aspect of the invention, the airflow passageway is defined between one of: (a) the outer surface of the pump module and a recessed portion of the inner surface of the casing; and (b) the inner surface of the casing and a recessed portion of the outer surface of the pump module.

In yet another aspect of the invention, the airflow passageway can be an inlet air passageway communicating between ambient air outside the casing and an air inlet on the pump module and/or an outlet air passageway communicating between an air outlet on the pump module and ambient air outside the casing.

Other features and advantages of the invention will become apparent to those skilled in the art upon review of the following detailed description, claims, and drawings.

Figure 1:
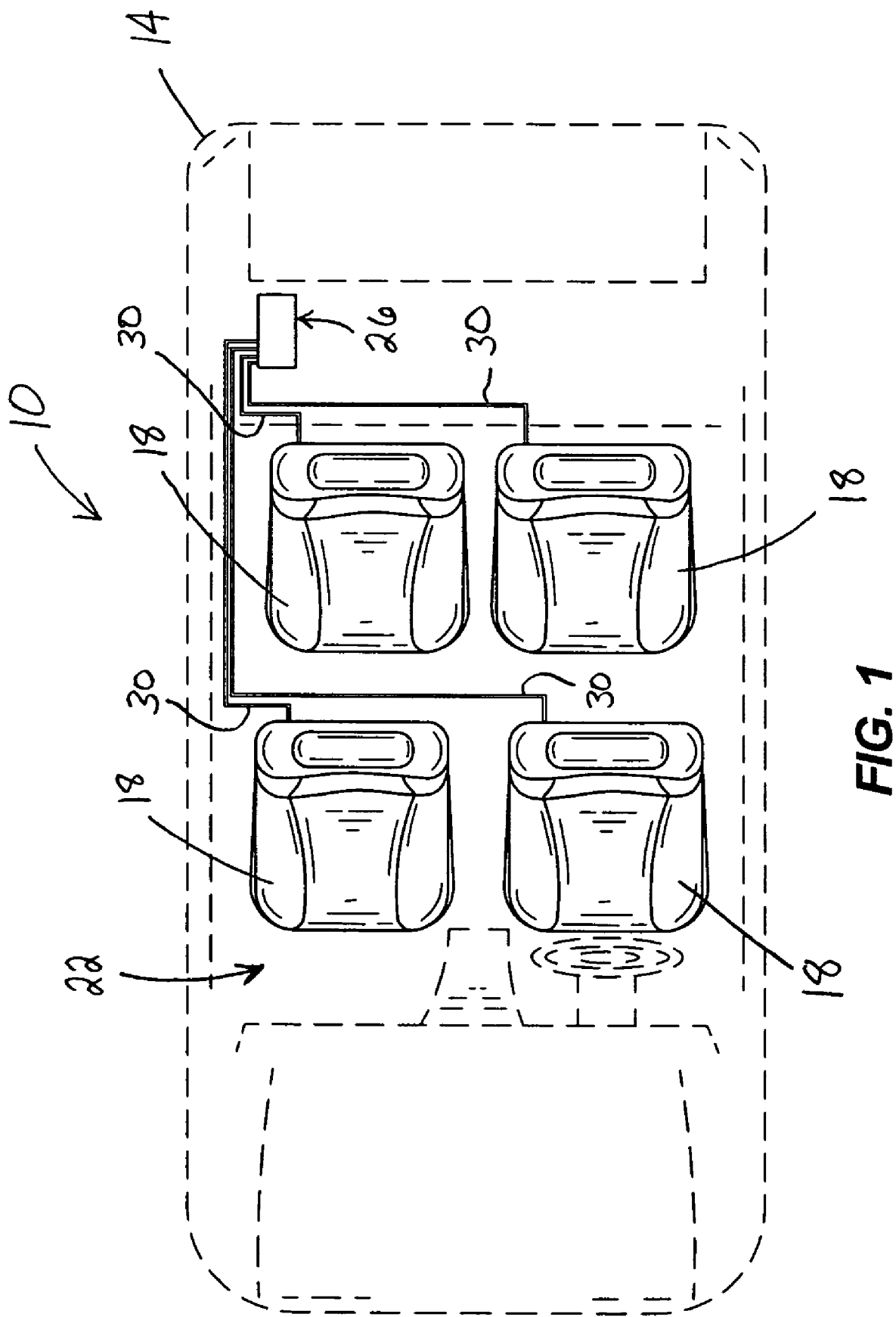
FIG. 1 is a schematic view of a seat control system for a vehicle.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having", and "comprising" and variations thereof herein is meant to encompass the items listed thereafter and equivalents thereof as well as additional items.

DETAILED DESCRIPTION

FIG. 1 illustrates a seat control system 10 for a vehicle 14. As illustrated in FIG. 1, the vehicle 14 includes four drive dynamic seats 18 positioned within a passenger compartment 22 of the vehicle 14. Of course, fewer or more drive dynamic seats 18 could be present. An air pump assembly 26 is positioned on the vehicle 14 to supply compressed air to the seats 18 via respective conduits 30. In the illustrated embodiment, the air pump assembly 26 is positioned behind one of the rear seats 18, and is accessible from the trunk of the vehicle 14. However, the air pump assembly 26 can be located at any convenient location on the vehicle 14.

The air pump assembly 26 provides compressed air to one or more of the seats 18 to achieve desired seat manipulation. For example, portions of the seats 18 can be raised or lowered during cornering or other vehicle maneuvering (e.g., braking, accelerating, etc.) for passenger comfort. Additionally, the firmness of various seat surfaces can be adjusted to passenger liking. Furthermore, the compressed air can provide massage capabilities to the seats 18. The compressed air can be supplied to one or more bolsters in each seat 18 to achieve the desired effect. The air pump assembly 26 can be electrically connected to the Engine Control Unit (ECU—not shown), which controls the operation of the air pump assembly 26.

Figure 2:
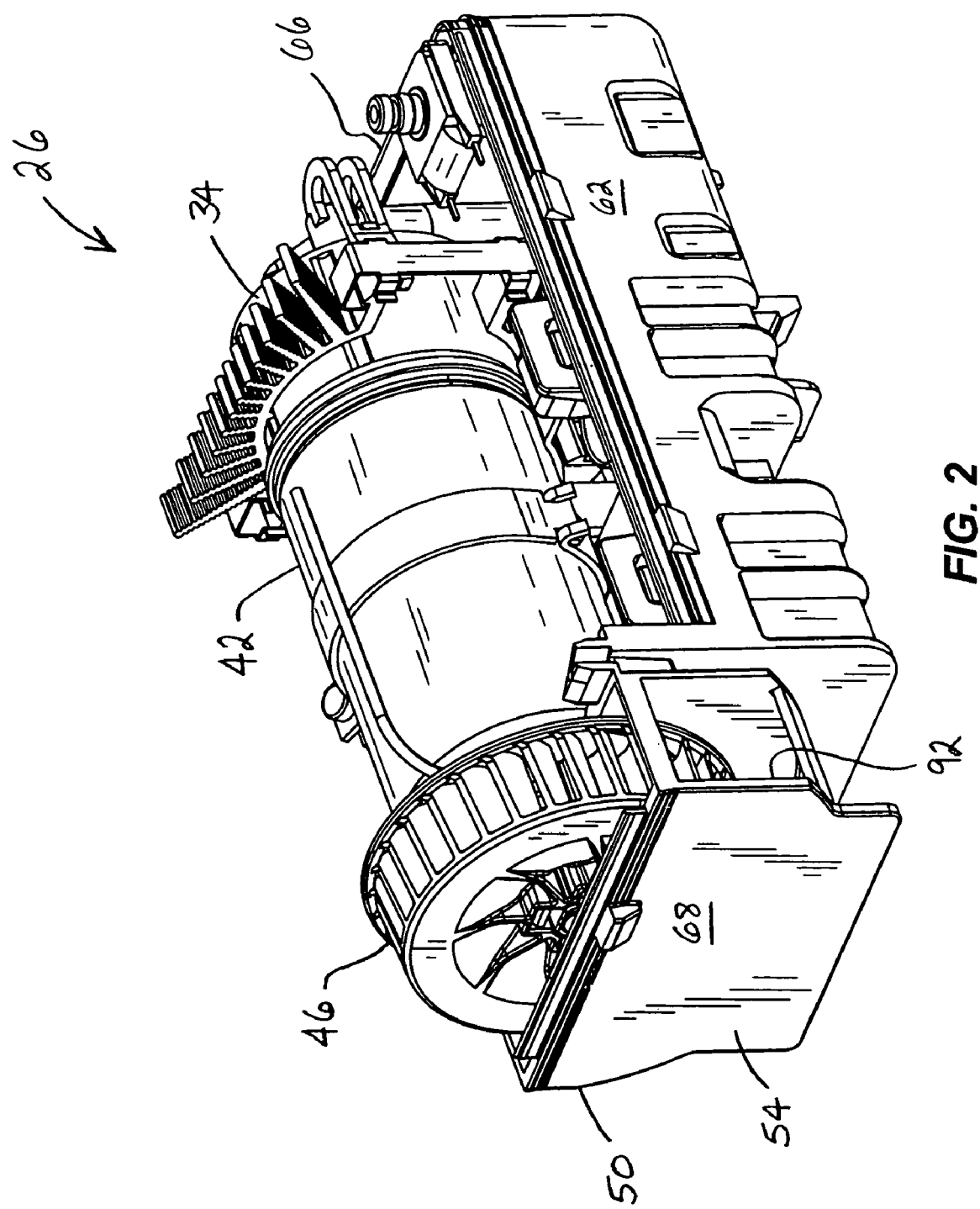
FIG. 2 is a perspective view taken from the outlet end of a partially-assembled air pump assembly embodying the invention, shown in a first orientation, and with the cover and a portion of the housing removed.

Referring now to FIG. 2, the air pump assembly 26 includes an air pump or compressor 34 configured to be coupled to the conduits 30 for providing compressed air generated by the pump 34 to the conduits 30. The pump 34 is driven by an electric motor 42 adjacent the pump 34. The pump 34 and motor 42 include the associated electronics for communicating with the ECU and for controlling operation of the air pump assembly 26.

The air pump assembly 26 further includes a fan 46 for providing cooling airflow to the pump 34 and the motor 42, as will be described in greater detail below. In the illustrated embodiment, the fan 46 is a centrifugal fan driven by the motor 42. However, those skilled in the art will understand that other types of fans can also be used.

Figure 3:
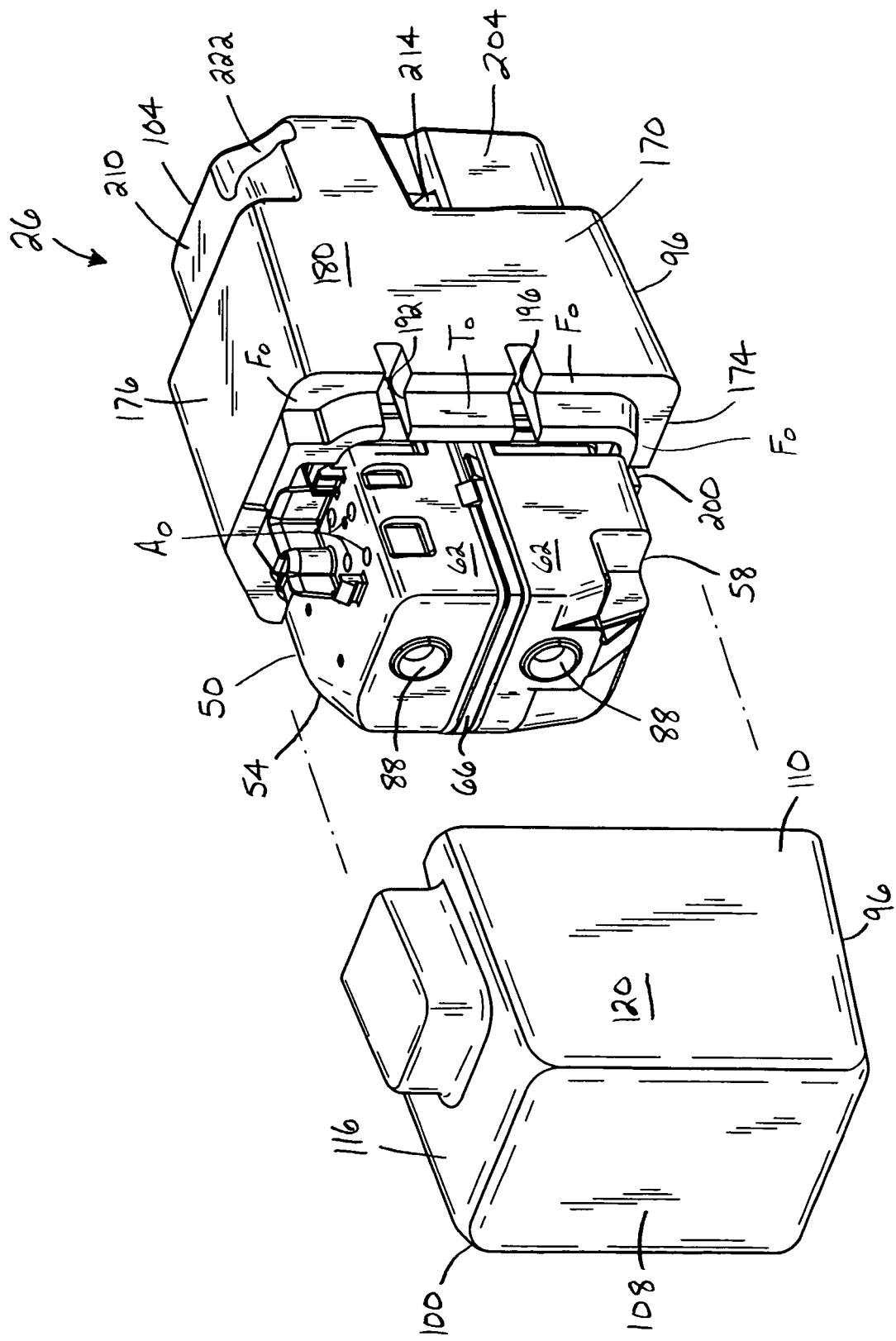
FIG. 3 is a perspective view taken from the inlet end of the air pump assembly of FIG. 2, shown in a second orientation opposite the first orientation, and with the housing assembled and a portion of the cover removed.
Figure 5:
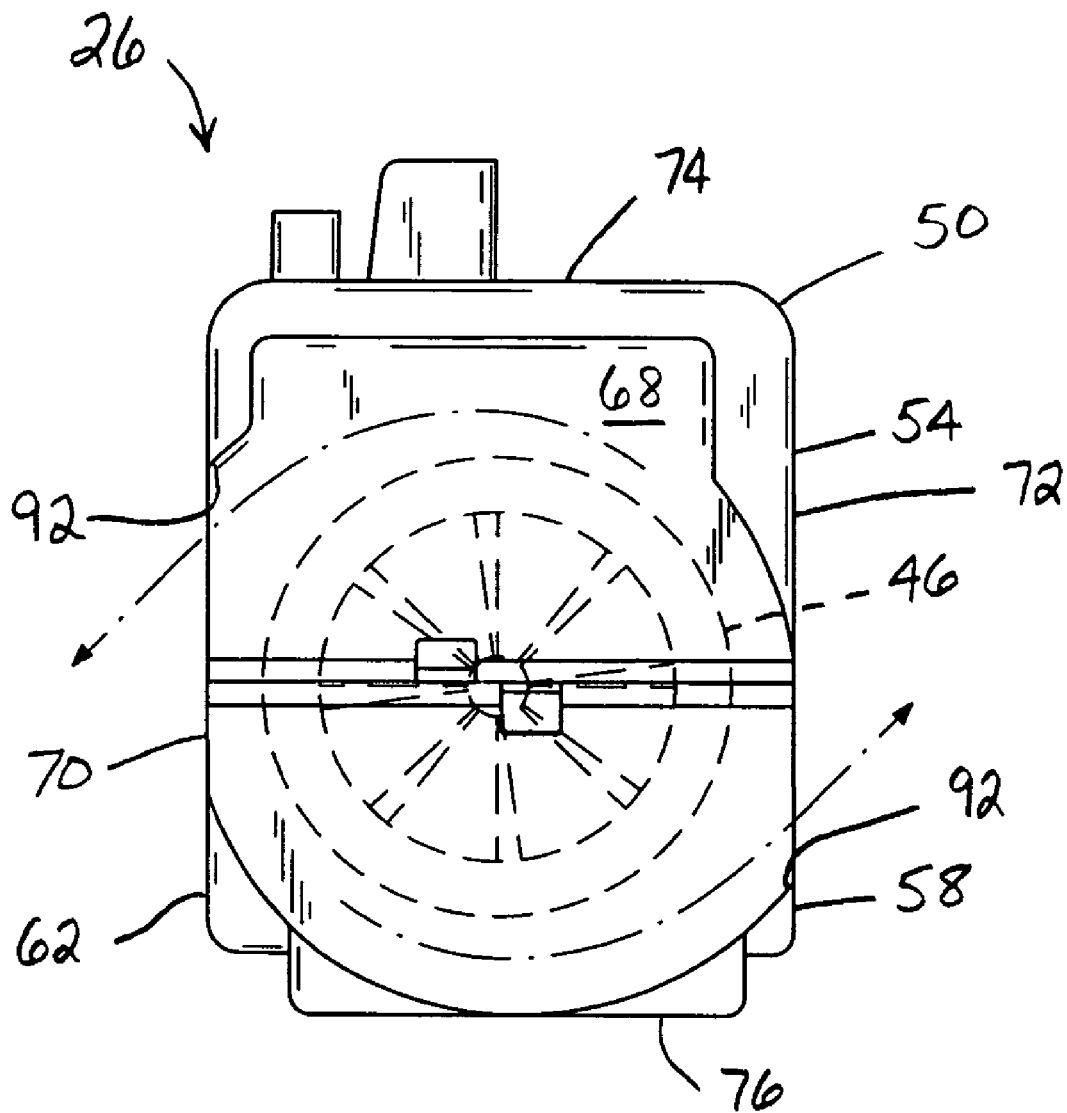
FIG. 5 is an end view of the outlet end of the air pump assembly of FIG. 2, shown in the second orientation, and with the cover removed.

Referring now to FIGS. 2, 3, and 5, a housing 50 surrounds at least a portion of the pump 34, the motor 42, and the fan 46. In the illustrated embodiment, the housing 50 is a two-piece, plastic construction defining a first housing portion 54 and a second housing portion 58. Of course, the housing 50 could be more than two pieces, and could be made of other suitable materials besides plastic. As shown in FIG. 3, the first housing portion 54 includes air inlets and outlets Ao where air enters and exits the housing 50 in communication with the pump 34. While four apertures Ao are shown, they need not all be used, and there could also be different numbers of apertures Ao. A pressure regulator and manifold assembly (not shown) can be attached to the first housing portion 54 in the vicinity of and in communication with the air inlets and outlets Ao.

Referring now to FIG. 5, the assembled housing 50 defines an outer surface 62 comprising first and second end surfaces 66 (see FIG. 3), 68, respectively, first and second side surfaces 70, 72, respectively, a top surface 74, and a bottom surface 76. As used herein and in the appended claims, the terms "end", "side", "top" and "bottom" are used for purposes of description only and are not intended to imply any specific orientation. The first end surface 66 is positioned adjacent the pump 34 and, as shown in FIG. 3, includes one or more air inlets 88 for allowing ambient air to enter the housing 50. In the illustrated embodiment, two air inlets 88 are shown and take the form of nozzles. Of course, other forms of inlet structure (e.g., holes, slotted vent arrangements, etc.) can also be used for the air inlets 88, however, the nozzles have been found to be less restrictive to airflow entering the housing 50.

As shown in FIG. 2, the second end surface 68 is located adjacent the fan 46 opposite the first end surface 66. As seen in FIGS. 2 and 5, closely adjacent the second end surface 68, the first and second side surfaces 70, 72 each include a respective air outlet 92 configured to allow cooling air to exit the housing 50 adjacent the fan 46. Of course, fewer or more air outlets 92 could be defined in the housing 50. The portion of the housing 50 adjacent the fan 46 and the air outlets 92 is configured to define a volute geometry around the fan 46 to achieve the desired airflow characteristics.

To prevent the pump 34 and motor 42 from overheating, the fan 46 is driven by the motor 42 to draw air into the housing 50 through the air inlets 88. The ambient air travels around the pump 34 and the motor 42 absorbing heat along the way. The heated air is then blown out of the air outlets 92 in the housing 50 by the fan 46.

Referring now to FIGS. 3, 4a, 4b, 6, and 7, the air pump assembly 26 further includes a cover 96 surrounding at least a portion of the housing 50. In the illustrated embodiment, the cover 96 is a two-piece construction defining a first or inlet end portion 100 and a second or outlet end portion 104. Of course, the cover 96 could be more than two pieces, and could be divided in different manners from that shown in the figures.

The cover 96 is made of a sound absorbing material such as polyurethane foam, however other foams, plastics, and suitable materials that can dampen and absorb the noise created by operation of the pump 34, the motor 42, and the fan 46 can also be used. The sound dampening cover 96 is constructed to reduce noise emitted during operation of the air pump assembly 26 in order to minimize the noise observed by passengers in the passenger compartment 22 of the vehicle 14. In addition to minimizing the emission of noise, the cover 96 is also designed to minimize the restriction of ambient airflow into the housing 50 in order to provide maximum cooling of the pump 34 and motor 42.

The design of the cover 96 balances the competing interests of minimizing sound emissions (wherein complete coverage of the housing 50 would eliminate any noise transmission pathways to the ambient) and maximizing cooling airflow (wherein the housing 50 would be completely and directly exposed to the ambient for minimal airflow restriction). To achieve this balance, the cover 96 incorporates airflow passageways configured to permit communication between the ambient and the inside of the housing 50, while at the same time minimizing the ease with which sound waves can travel from within the housing 50 to the ambient.

Figure 4A:
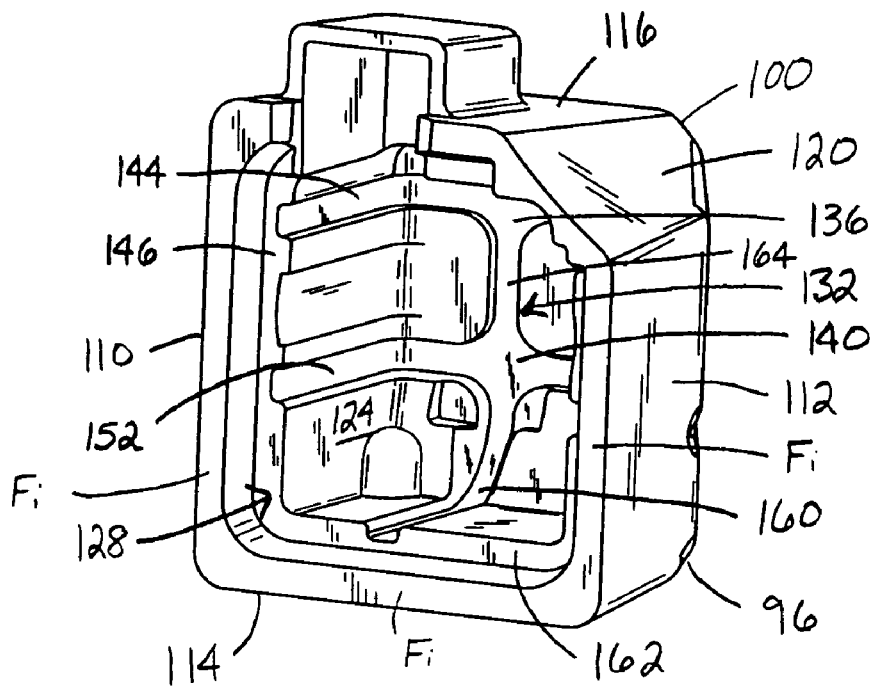
FIGS. 4a and 4b are perspective views showing the inside of an inlet end portion of the cover.
Figure 4B:
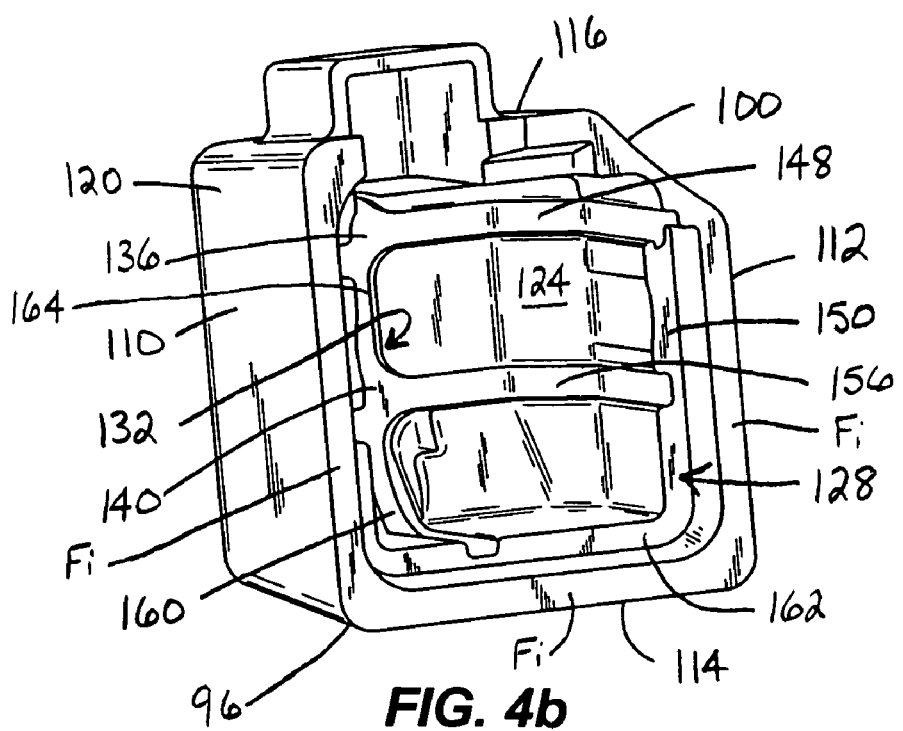

Referring to FIGS. 3, 4a, and 4b, the inlet end portion 100 of the cover 96 includes an end wall 108, two side walls 110, 112, a bottom wall 114, and a top wall 116. The walls 108, 110, 112, 114, and 116 collectively define an outer surface 120 and an inner surface 124. The inner surface 124 defines a cavity 128 formed in the inlet end portion 100 of the cover 96, and that is sized to snugly receive a portion of the housing 50. As used herein and in the appended claims, the terms "snug" or "snugly" when used to describe the fit between two mating parts means that there is substantial engagement between respective surfaces of the two parts such that relative movement between the two parts is substantially prevented when assembled.

The inner surface 124 includes a labyrinth-shaped recess 132 designed to provide one or more air passageways for ambient air outside the cover 96 to enter the air inlets 88. In the illustrated embodiment, the labyrinth-shaped recess 132 includes first and second manifold recess portions 136, 140 located adjacent the two air inlets 88. A first recess portion 144 (FIG. 4a) is defined in the inner surface of the end wall 108 and the inner surface of the side wall 110 to communicate between the manifold recess portion 136 and a shoulder portion 146 formed in the side wall 110. A second recess portion 148 (FIG. 4b) is defined in the inner surface of the end wall 108 and the inner surface of the side wall 110 to communicate between the manifold recess portion 136 and a shoulder portion 150 formed in the side wall 112. A third recess portion 152 (FIG. 4a) is defined in the inner surface of the end wall 108 and the inner surface of the side wall 110 to communicate between the manifold recess portion 140 and the shoulder portion 146 formed in the side wall 110. A fourth recess portion 156 (FIG. 4b) is defined in the inner surface of the end wall 108 and the inner surface of the side wall 112 to communicate between the manifold recess portion 140 and the shoulder portion 150 formed in the side wall 112. A fifth recess portion 160 (FIGS. 4a and 4b) is defined in the inner surface of the end wall 108 and the inner surface of the bottom wall 114 to communicate between the manifold recess portion 140 and a shoulder portion 162 formed in the bottom wall 114. A sixth recess portion 164 (FIGS. 4a and 4b) is defined in the inner surface of the end wall 108 to communicate between the two manifold recess portions 136 and 140. With the exception of the sixth recess portion 164, each recess portion includes at least one bend at the transition between the two walls in which the recesses are defined.

As will be described in detail below, ambient air enters the labyrinth-shaped recess 132 adjacent the shoulder portions 146, 150, 162, and travels through the air passageways defined between the outer surface 62 of the housing 50 and the respective recess portions 144, 148, 152, 156, and 160 formed in the inner surface 124 of the cover 96. The inlet air is forced to change directions due to the configurations of the air passageways. When the ambient air arrives at one of the manifold recess portions 136, 140 it can enter the housing 50 through the associated air inlet 88, or it can pass through the sixth recess portion 164 to the other of the manifold recess portions 136, 140.

The labyrinth-shaped recess 132 provides a sufficient number of airflow passageways so that sufficient ambient air can reach the air inlets 88 for cooling the pump 34 and the motor 42. The configuration of the labyrinth-shaped recess 132 also helps reduce or eliminate the transmission of noise from within the housing 50. Specifically, sound waves generated within the housing 50 may exit the housing 50 at the air inlets 88, but will encounter the inner surface of the end wall 108 defining the manifold recess portions 136, 140. Whatever sound waves are not absorbed by the sound absorbing material of the cover 96 would be forced to change direction and travel back into the air inlets 88 or through the recess portions 144, 148, 152, 156, 160, and 164. Before being able to exit the cover 96, the sound waves would encounter the at least one bend formed at the transition between the two walls 108 and 110, 108 and 112, or 108 and 114 in the respective recess portions 144, 148, 152, 156, and 160, such that most or all of any remaining sound waves would be absorbed by the sound absorbing material of the cover 96. Any remaining sound waves would again be forced to change direction and travel back toward the air inlets 88 or through the next leg of the recess portions 144, 148, 152, 156, and 160, where continued absorption would occur.

It is to be understood, that other configurations for the labyrinth-shaped recess 132 can be used without deviating from the invention. For example, more or fewer recess portions could be used. Additionally, the recess portions 144, 148, 152, 156, and 160 could be configured differently with additional bends and turns. The size and configuration of the recess manifold portions 136, 140 can also be varied. Furthermore, while the illustrated air passageways are defined within the recess portions 144, 148, 152, 156, 160, and 164 between the outer surface 62 of the housing 50 and the inner surface 124 of the cover 94, at least a portion of the air passageways could be formed entirely within one or more walls 108, 110, 112, 114, and 116 of the cover 96. For example, a bore could be formed entirely within one or more walls 108, 110, 112, 114, and 116 of the cover 96.

The inlet end portion 100 of the cover 96 can be formed by molding the sound absorbing material to the desired shape. The molding process is well suited for forming the labyrinth-shaped recess 132 in the inner surface 124. Alternatively, the labyrinth-shaped recess 132 could be formed by separately machining a pre-molded inlet end portion 100. In yet another embodiment, the inlet end portion 100 could be entirely machined, and not molded.

Figure 7:
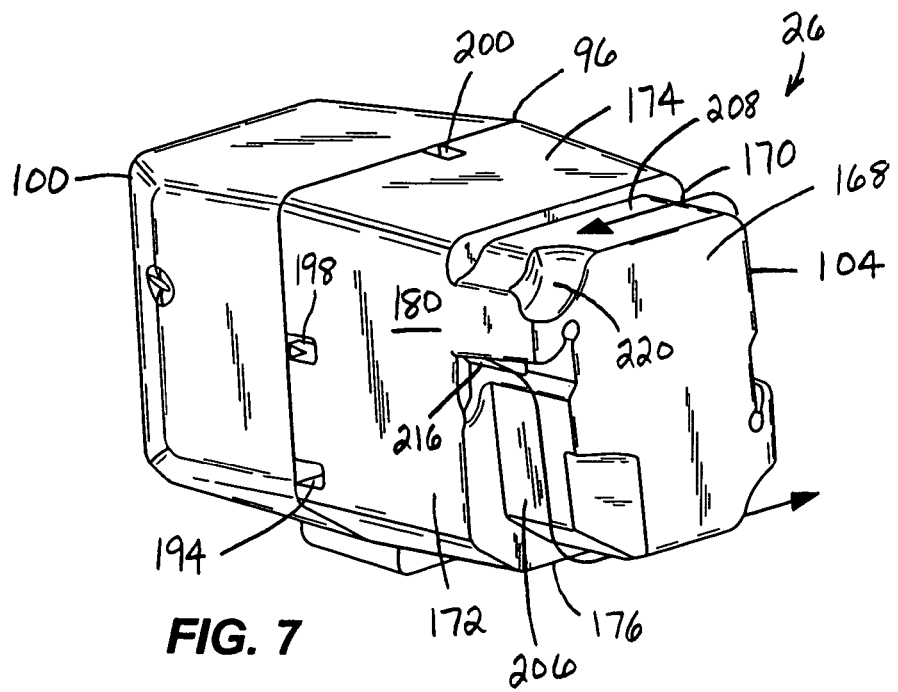
FIG. 7 is a perspective view of the air pump assembly similar to FIG. 6, but shown with the cover fully assembled and without the mounting bracket.

With reference to FIGS. 3 and 7, the outlet end portion 104 of the cover 96 includes an end wall 168, two side walls 170, 172, a bottom wall 174 (the bottom as shown in FIG. 3), and a top wall 176 (the top as shown in FIG. 3). The walls 168, 170, 172, 174, and 176 collectively define an outer surface 180 and an inner surface (not shown). The inner surface defines a cavity formed in the outlet end portion 104 of the cover 96, and that is sized to snugly receive the portion of the housing 50 not received within the inlet end portion 100 (see FIG. 3). When assembled, the inlet and outlet portions 100, 104 substantially envelop and enclose the housing 50. Mating faces Fi (see FIGS. 4a and 4b) formed on the walls 108, 110, 112, 114, and 116 of the inlet end portion 100 abut corresponding mating faces Fo (see FIG. 3) on the walls 170, 172, 174, and 176 of the outlet end portion 104. A tongue portion To (see FIG. 3) on the outlet end portion 104 of the cover 96 extends into engagement with the shoulder portions 146, 150, and 162 of the inlet end portion 100 of the cover 96.

Still referring to FIGS. 3 and 7, the tongue portion To includes apertures 192, 194, 196, 198, and 200 in the form of slots that extend into the respective walls of the outlet end portion 104 and that correspond in position to the recess portions 144, 148, 152, 156, and 160 of the inlet end portion 100 to provide access for ambient air into the air passageways formed in the inlet end portion 100. Ambient air enters the apertures 192, 194, 196, 198, and 200, travels through the tongue portion To of the outlet end portion 104 and into the recess portions 144, 148, 152, 156, and 160 of the inlet end portion 100 through the shoulder portions 146, 150, and 162. The apertures 192, 194, 196, 198, and 200 in the tongue portion To also define another bend that would require any remaining sound waves reaching the apertures 192, 194, 196, 198, and 200, to change direction yet again before being able to exit the outlet end portion 104 to the ambient.

With continued reference to FIGS. 3 and 7, each of the side walls 170, 172, the bottom wall 174, and the top wall 176 of the outlet end portion 104 further includes a respective recessed portion 204, 206, 208, and 210, the purpose of which will be described in greater detail below. Each side wall 170, 172 includes a respective aperture 214, 216 generally aligned with the corresponding air outlets 92 of the housing 50. As shown in FIG. 3, the aperture 214 is formed in the outlet end portion 104 such that air exiting the housing 50 through the associated air outlet 92 is directed toward the recessed portion 204 in the side wall 170. Likewise, as shown in FIG. 7, the aperture 216 is formed such that air exiting the associated air outlet 92 is directed toward the recessed portion 206 in the side wall 172.

The recessed portion 208 on the bottom wall 174 includes a stepped, scalloped recess 220 (see FIG. 7), and the recessed portion 210 on the top wall 176 includes a stepped, scalloped recess 222 (see FIG. 3). The purpose of the scalloped recesses 220 and 222 will be described in greater detail below.

Like the inlet end portion 100, the outlet end portion 104 can be formed by molding the sound absorbing material to the desired shape. The molding process is well suited for forming the recessed portions 204, 206, 208, 210, 220, and 222 in the outer surface 180. Alternatively, the recessed portions 204, 206, 208, 210, 220, and 222 could be formed by separately machining a pre-molded outlet end portion 104. In yet another embodiment, the outlet end portion 104 could be entirely machined, and not molded.

Figure 6:
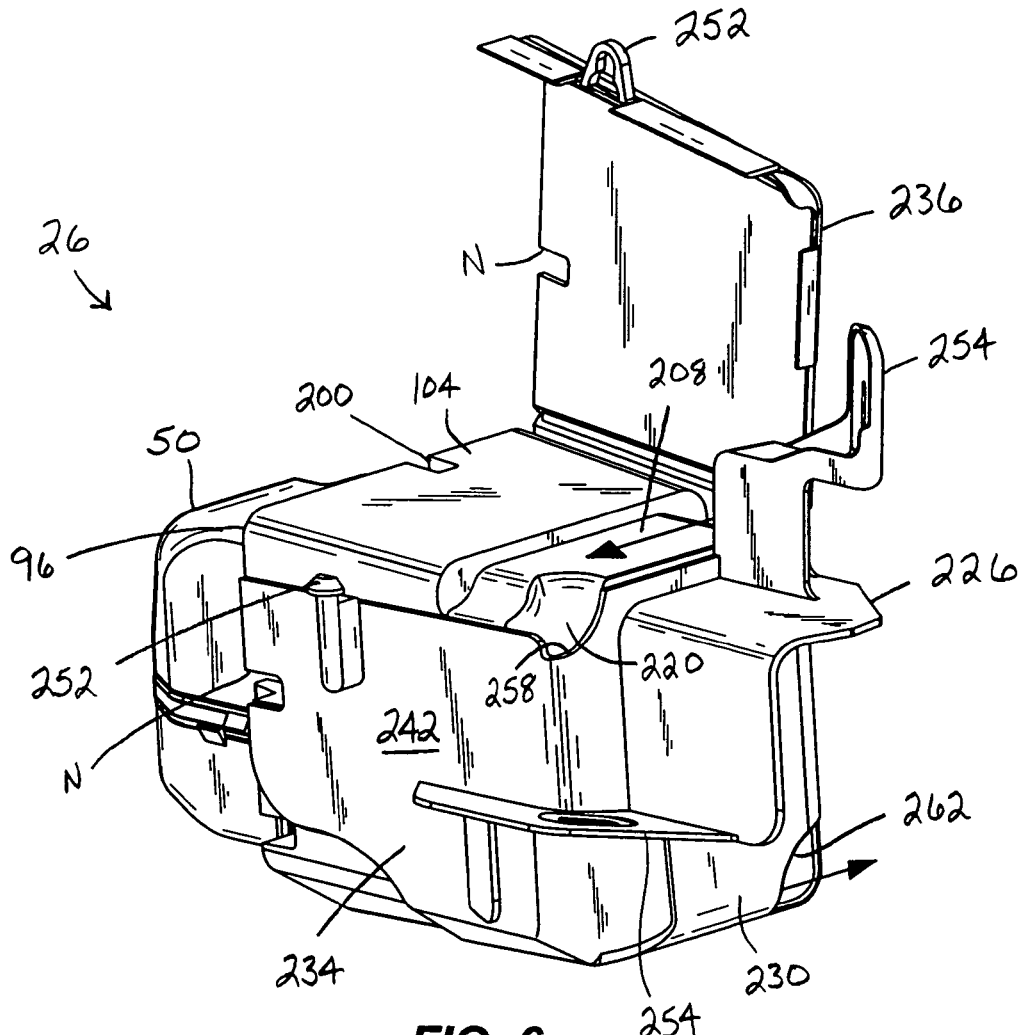
FIG. 6 is a perspective view taken from the outlet end of the air pump assembly of FIG. 2, shown in the first orientation, with a portion of the cover removed, and including a mounting bracket.
Figure 8:
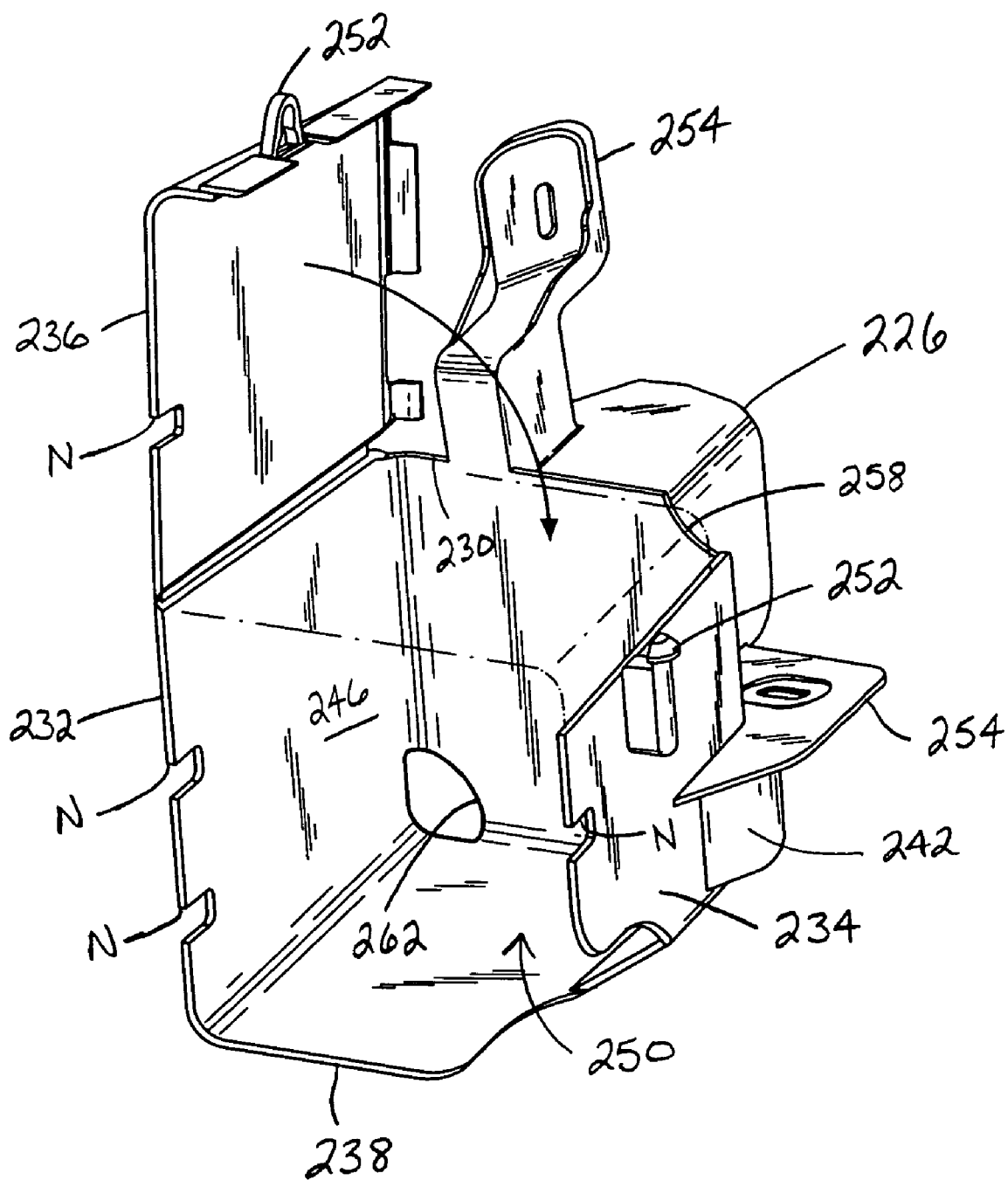
FIG. 8 is a perspective view of the mounting bracket shown in FIG. 6.

Referring now to FIGS. 6 and 8, the air pump assembly 26 further includes a mounting bracket 226 configured to securely receive and envelop at least a portion of the cover 96 so that the air pump assembly 26 can be mounted to the vehicle 14. The mounting bracket 226 can be made of metal, plastic, or other suitable materials and includes an end wall 230, two side walls 232, 234, a top wall 236, and a bottom wall 238. The walls 230, 232, 234, 236, and 238 collectively define an outer surface 242 and an inner surface 246 (see FIG. 8). The inner surface 246 defines a cavity 250 that is sized to snugly receive the outlet end portion 104 of the cover 96, as shown in FIG. 6.

To facilitate inserting the outlet end portion 104 of the cover 96 into the cavity 250 of the mounting bracket 226, the top wall 236 is movably coupled to the side wall 232 between an open position (shown in solid lines in FIG. 8) and a closed position (shown in dashed lines in FIG. 8). In the illustrated embodiment, the top wall 236 is pivotally connected in a hinge-like manner to the side wall 232. A latch mechanism 252 formed partially on the top wall 236 and partially on the side wall 234 cooperates to secure the top wall 236 in the closed position. However, the top wall 236 could be movably or removably coupled to the remainder of the mounting bracket 226 in any suitable manner. Alternatively, instead of the top wall 236, any of the walls 232, 234, or 238 could be movably or removably coupled to the remainder of the mounting bracket 226.

The mounting bracket 226 includes mounting flanges 254 configured to mount the bracket 226 to the vehicle 14. The configuration and location of the mounting flanges 254 is not critical, and can vary depending on the vehicle 14 into which the air pump assembly 26 is mounted.

Each of the walls 232, 234, and 236 includes notches N generally aligned with the corresponding apertures 192, 194, 196, 198, and 200 in the outlet end portion 104 of the cover 96. The notches N provide an unobstructed pathway for ambient air to enter the apertures 192, 194, 196, 198, and 200 and to pass through the air passageways in the inlet end portion 100, as described above.

The inner surface 246 of the mounting bracket 226 cooperates with the outer surface 180 of the outlet end portion 104 of the cover 96 to define labyrinth-shaped air passageways communicating between the apertures 214, 216, which are generally aligned with the corresponding air outlets 92 of the housing 50, and the ambient. These labyrinth-shaped air passageways allow heated air to exit the housing 50, the cover 96, and the mounting bracket 226 while at the same time reducing or eliminating the transmission of noise to the ambient.

Specifically, with reference to FIGS. 3, 6, and 7, heated air exiting the air outlets 92 in the housing 50 passes through the apertures 214, 216 of the cover 96. As shown in FIG. 3, air exiting the aperture 214 is initially directed in an air passageway defined between the inner surface of the side wall 232 and the recessed portion 204 in the side wall 170 of the outlet end portion 104. As evident from FIG. 6, the outlet air then changes direction when it hits the inner surface of the top wall 236 of the mounting bracket 226 to travel in the second leg of the air passageway defined between the inner surface of the top wall 236 and the recessed portion 208 in the outlet end portion 104. Finally, the outlet air enters the stepped, scalloped recess 220, where it again changes direction toward the end wall 230 of the mounting bracket 226 before exiting through an aperture 258 formed in the end wall 230.

Likewise, as shown in FIG. 7, air exiting the aperture 216 is initially directed in an air passageway defined between the inner surface of the side wall 234 and the recessed portion 206 in the side wall 172 of the outlet end portion 104. As evident from both FIGS. 6 and 7, the outlet air then changes direction when it hits the inner surface of the bottom wall 238 of the mounting bracket 226 to travel in the second leg of the air passageway defined between the inner surface of the bottom wall 238 and the recessed portion 210 in the outlet end portion 104. Finally, the outlet air enters the stepped, scalloped recess 222, where it again changes direction toward the end wall 230 of the mounting bracket 226 before exiting through an aperture 262 formed in the end wall 230.

The multiple direction changes in the air passageways operate to significantly reduce the ability of sound waves to reach the ambient. Each change in direction results in more sound waves being absorbed by the sound absorbing material defining the outer surface 180 of the outlet end portion 104 of the cover 96.

It can be seen how the concept of non-linear airflow passageways is employed on the air pump assembly 26 to provide the proper airflow characteristics, while at the same time operating to minimize the transmission of noise from within the air pump assembly 26. With respect to inlet airflow, the pump 34, the motor 42, the fan 46 and the housing 50 define an air pump module snugly surrounded by a casing in the form of the cover 96. At least one inlet airflow passageway is defined between an outer surface of the air pump module (here the outer surface 62 of the housing 50) and the inner surface of the casing (here the inner surface 124 of the inlet end portion 100 of the cover 96). The configuration of the inlet airflow passageways, which causes the airflow to change directions at least one time, operates to significantly reduce the noise transmitted to the ambient through the inlet airflow passageways. While the inlet airflow passageways are illustrated as being defined between the outer surface 62 of the housing 50 and the labyrinth-shaped recess 132 formed on the inner surface 124 of the cover 96, those skilled in the art would understand that a reverse scenario, where a labyrinth-shaped recess was formed on the outer surface 62 of the housing 50 instead of on the inner surface 124 of the cover 96, could accomplish the same effect. Additionally, both the outer surface 62 of the housing 50 and the inner surface 124 of the cover 96 could include recessed portions that cooperate to define the airflow passageways.

The same principle is also applied to the outlet airflow passageways. With respect to outlet airflow, the pump 34, the motor 42, the fan 46, the housing 50, and the cover 96 define an air pump module snugly surrounded by a casing in the form of the mounting bracket 226. At least one outlet airflow passageway is defined between an outer surface of the air pump module (here the outer surface 180 of the outlet end portion 104 of the cover 96) and the inner surface of the casing (here the inner surface 246 of the mounting bracket 226). The configuration of the outlet airflow passageways, which causes the airflow to change directions at least one time, operates to significantly reduce the noise transmitted to the ambient through the outlet airflow passageways. While the outlet airflow passageways are illustrated as being defined between the recessed portions 204, 206, 208, 210, 220, and 222 formed in the outer surface 180 of the cover 96 and the inner surface 246 of the mounting bracket 226, those skilled in the art would understand that a reverse scenario, where recesses or channels could be formed in the inner surface 246 of the mounting bracket 226 instead of on the outer surface 180 of the cover 96, could accomplish the same effect. Additionally, both the inner surface 246 of the mounting bracket and the outer surface 180 of the cover 96 could include recessed portions that cooperate to define the airflow passageways.

Various features of the invention are set forth in the following claims.

The invention claimed is:

1. An air pump assembly comprising:
    a pump module having an outer surface; and
    a casing at least partially surrounding the pump module, the casing having an inner surface defining a cavity sized to snugly receive the pump module such that the outer surface of the pump module is in substantial engagement with the inner surface of the casing and is substantially prevented from moving with respect to the casing when the pump module is received within the cavity; and
    wherein at least one airflow passageway is defined by and extends along the inner surface of the casing and the outer surface of the pump module; and
    wherein the airflow passageway is configured such that air flowing through the passageway changes direction at least one time.

2. The air pump assembly of claim 1, wherein the airflow passageway is defined between one of
    the outer surface of the pump module and a recessed portion of the inner surface of the casing; and the inner surface of the casing and a recessed portion of the outer surface of the pump module.

3. The air pump assembly of claim 1, wherein the airflow passageway communicates between ambient air outside the casing and an air inlet on the pump module.

4. The air pump assembly of claim 1, wherein the airflow passageway communicates between an air outlet on the pump module and ambient air outside the casing.

5. The air pump assembly of claim 1, wherein the air pump module includes
an air pump;
a motor drivingly connected to the air pump; and
a housing surrounding at least a portion of the air pump and the motor, the housing having an outer surface defining the outer surface of the air pump module; and
wherein the casing includes a cover surrounding at least a portion of the housing and having an inner surface defining the inner surface of the casing.

6. The air pump assembly of claim 5, wherein the housing includes an air inlet, wherein the at least one airflow passageway is at least partially defined by the outer surface of the housing and a recess formed on the inner surface of the cover, and wherein the at least one airflow passageway communicates between ambient air outside the cover and the air inlet.

7. The air pump assembly of claim 6, wherein the at least one airflow passageway includes at least one bend such that air entering the passageway from outside the cover changes direction at least one time prior to reaching the air inlet.

8. The air pump assembly of claim 6, wherein the cover is made of sound absorbing material.

9. The air pump assembly of claim 8, wherein the cover is made by a molding process, and wherein the recess on the inner surface of the cover is formed during the molding process.

10. The air pump assembly of claim 6, further comprising a second airflow passageway at least partially defined by the outer surface of the housing and a second recess formed on the inner surface of the cover, and wherein the second airflow passageway communicates between ambient air outside the cover and the air inlet.

11. The air pump assembly of claim 10, wherein the airflow passageways converge at a manifold formed by a recessed portion of the inner surface of the cover adjacent the air inlet.

12. The air pump assembly of claim 10, wherein the housing includes a second air inlet, and wherein the airflow passageways communicate with both the first and second air inlets.

13. The air pump assembly of claim 6, wherein the air inlet is a nozzle.

14. The air pump assembly of claim 6, wherein the at least one airflow passageway is at least partially defined by a labyrinth-shaped recess on the inner surface of the cover.

15. The air pump assembly of claim 5, wherein the cover is a two-piece cover.

16. The air pump assembly of claim 1, wherein the air pump module includes
an air pump;
a fan;
a motor drivingly connected to the air pump and the fan;
a housing surrounding at least a portion of the air pump, the fan, and the motor; and
a cover surrounding at least a portion of the housing, the cover having an outer surface defining the outer surface of the air pump module; and
wherein the casing includes a mounting bracket surrounding at least a portion of the cover and having an inner surface defining the inner surface of the casing.

17. The air pump assembly of claim 16, wherein the cover includes an air outlet, wherein the at least one airflow passageway is at least partially defined by the inner surface of the mounting bracket and a recess formed on the outer surface of the cover, and wherein the at least one airflow passageway communicates between the air outlet and ambient air outside the mounting bracket.

18. The air pump assembly of claim 17, wherein the at least one airflow passageway includes at least one bend such that air entering the passageway from the air outlet changes direction at least one time prior to exiting from within the mounting bracket.

19. The air pump assembly of claim 17, wherein the cover is made of sound absorbing material.

20. The air pump assembly of claim 19, wherein the cover is made by a molding process, and wherein the recess on the outer surface of the cover is formed during the molding process.

21. The air pump assembly of claim 17, wherein the housing includes a second air outlet, wherein the air pump assembly further includes a second airflow passageway at least partially defined by the inner surface of the mounting bracket and a second recess formed on the outer surface of the cover, and wherein the second airflow passageway communicates between the second air outlet and ambient air outside the mounting bracket.

22. The air pump assembly of claim 17, wherein the fan is a centrifugal fan positioned adjacent the air outlet.

23. The air pump assembly of claim 16, wherein the cover is a two-piece cover.

24. The air pump assembly of claim 16, wherein the mounting bracket includes an aperture that allows air in the at least one airflow passageway to exit the mounting bracket.

25. The air pump assembly of claim 16, wherein the mounting bracket includes a movable portion movable between an open position, wherein the air pump module can be inserted and removed from the mounting bracket, and a closed position, wherein the movable portion defines at least part of the inner surface of the casing.

26. The air pump assembly of claim 16, wherein the mounting bracket is configured to mount the air pump module in a vehicle for use in manipulating a passenger seat.

27. A seat control system for a vehicle, the system comprising:
a seat;
an air pump assembly on the vehicle; and
a conduit connected between the seat and the air pump assembly to provide air to the seat;
wherein the air pump assembly includes
a pump module having an outer surface; and
a casing at least partially surrounding the pump module, the casing having an inner surface defining a cavity sized to snugly receive the pump module such that the outer surface of the pump module is in substantial engagement with the inner surface of the casing and is substantially prevented from moving with respect to the casing when the pump module is received within the cavity; and
wherein at least one airflow passageway is defined by and extends along the inner surface of the casing and the outer surface of the pump module; and
wherein the airflow passageway is configured such that air flowing through the passageway changes direction at least one time.

28. The seat control system of claim 27, wherein the airflow passageway is defined between one of the outer surface of the pump module and a recessed portion of the inner surface of the casing; and the inner surface of the casing and a recessed portion of the outer surface of the pump module.

29. The seat control system of claim 27, wherein the airflow passageway communicates between ambient air outside the casing and an air inlet on the pump module.

30. The seat control system of claim 27, wherein the airflow passageway communicates between an air outlet on the pump module and ambient air outside the casing.

31. The seat control system of claim 27, wherein the pump module includes
   an air pump;
   a motor drivingly connected to the air pump; and
   a housing surrounding at least a portion of the air pump and the motor, the housing having an air inlet and an outer surface defining the outer surface of the air pump module;
   wherein the casing includes a cover surrounding at least a portion of the housing and having an inner surface defining the inner surface of the casing; and
   wherein the at least one airflow passageway is at least partially defined by the outer surface of the housing and a recess formed on the inner surface of the cover, wherein the at least one airflow passageway communicates between ambient air outside the cover and the air inlet, and wherein the at least one airflow passageway includes at least one bend such that air entering the passageway from outside the cover changes direction at least one time prior to reaching the air inlet.

32. The seat control system of claim 31, wherein the at least one airflow passageway is at least partially defined by a labyrinth-shaped recess on the inner surface of the cover.

33. The seat control system of claim 27, wherein the air pump module includes
   an air pump;
   a fan;
   a motor drivingly connected to the air pump and the fan;
   a housing surrounding at least a portion of the air pump, the fan, and the motor; and
   a cover surrounding at least a portion of the housing, the cover having an air outlet and an outer surface defining the outer surface of the air pump module;
   wherein the casing includes a mounting bracket surrounding at least a portion of the cover and having an inner surface defining the inner surface of the casing; and
   wherein the at least one airflow passageway is at least partially defined by the inner surface of the mounting bracket and a recess formed on the outer surface of the cover, wherein the at least one airflow passageway communicates between the air outlet and ambient air outside the mounting bracket, and wherein the at least one airflow passageway includes at least one bend such that air entering the passageway from the air outlet changes direction at least one time prior to exiting from within the mounting bracket.

34. An air pump assembly comprising:
   a pump module having an outer surface; and
   a casing at least partially surrounding the pump module, the casing having an inner surface defining a cavity sized to snugly receive the pump module such that the outer surface of the pump module is in substantial engagement with the inner surface of the casing and is substantially prevented from moving with respect to the casing when the pump module is received within the cavity; and
   wherein at least one airflow passageway is defined between the inner surface of the casing and the outer surface of the pump module; and
   wherein the airflow passageway communicates between ambient air outside the casing and an air inlet on the pump module.

35. A seat control system for a vehicle, the system comprising:
   a seat;
   an air pump assembly on the vehicle; and
   a conduit connected between the seat and the air pump assembly to provide air to the seat;
   wherein the air pump assembly includes
      a pump module having an outer surface; and
      a casing at least partially surrounding the pump module, the casing having an inner surface defining a cavity sized to snugly receive the pump module such that the outer surface of the pump module is in substantial engagement with the inner surface of the casing and is substantially prevented from moving with respect to the casing when the pump module is received within the cavity; and
      wherein at least one airflow passageway is defined between the inner surface of the casing and the outer surface of the pump module; and
      wherein the airflow passageway communicates between ambient air outside the casing and an air inlet on the pump module.

* * * * *